United States Patent
Lisseman et al.

(10) Patent No.: US 12,077,117 B2
(45) Date of Patent: *Sep. 3, 2024

(54) SYSTEMS AND METHODS FOR CHILD PRESENCE DETECTION WITH ACTIVE CHILD PROTECTION INTERLOCKS AND SAFETY WARNINGS

(71) Applicant: Joyson Safety Systems Acquisition LLC, Auburn Hills, MI (US)

(72) Inventors: Jason Lisseman, Pontiac, MI (US); Leonard Cech, Auburn Hills, MI (US)

(73) Assignee: Joyson Safety Systems Acquisition LLC, Auburn Hills, MI (US)

(*) Notice: Subject to any disclaimer, the term of this patent is extended or adjusted under 35 U.S.C. 154(b) by 23 days.

This patent is subject to a terminal disclaimer.

(21) Appl. No.: 17/566,138

(22) Filed: Dec. 30, 2021

(65) Prior Publication Data

US 2022/0203917 A1    Jun. 30, 2022

Related U.S. Application Data

(60) Provisional application No. 63/133,107, filed on Dec. 31, 2020.

(51) Int. Cl.
| | | |
|---|---|---|
| *B60R 21/015* | (2006.01) |
| *B60Q 5/00* | (2006.01) |
| *E05B 77/26* | (2014.01) |
| *G06V 20/59* | (2022.01) |
| *G06V 40/16* | (2022.01) |

(52) U.S. Cl.
CPC ........ *B60R 21/01538* (2014.10); *B60Q 5/005* (2013.01); *B60R 21/01544* (2014.10); *E05B 77/26* (2013.01); *G06V 20/593* (2022.01); *G06V 40/16* (2022.01)

(58) Field of Classification Search
CPC .... B60Q 5/005; B60Q 9/00; B60R 21/01538; B60R 21/01544; E05B 77/26; G06V 20/59; G06V 20/593; G06V 40/10; G06V 40/16; G08B 21/0461
See application file for complete search history.

(56) References Cited

U.S. PATENT DOCUMENTS

| | | |
|---|---|---|
| 5,905,210 A | 5/1999 | O'Boyle et al. |
| 5,918,696 A | 7/1999 | VanVoorhies |

(Continued)

*Primary Examiner* — Omer S Khan
(74) *Attorney, Agent, or Firm* — Meunier Carlin & Curfman LLC

(57) ABSTRACT

A passenger protection system for a vehicle includes a vehicle sensor control system having at least one processor and computerized memory storing vehicle control software therein, wherein the vehicle control software receives input data from a plurality of vehicle sensors. A digital control sequence is triggered in the software by a presence of at least one occupant other than a driver in the vehicle who is classified as a child, with the digital control sequence activating and de-activating an alert system and a system of electronically programmed interlocks in a vehicle control system. The alert system includes at least one of an audible alert and/or a visible alert and/or a haptic alert to ensure child safety in the vehicle during operation. The interlocks may electronically control numerous vehicle functions including window operation, seat position adjustment, and seat belt position adjustment.

10 Claims, 8 Drawing Sheets

(56) References Cited

U.S. PATENT DOCUMENTS

| | | | |
|---|---|---|---|
| 5,927,427 A | 7/1999 | Sewell et al. | |
| 5,927,491 A | 7/1999 | Room et al. | |
| 5,941,560 A * | 8/1999 | Wolfram | B60R 21/01556 |
| | | | 701/45 |
| 5,979,585 A | 11/1999 | Van Voorhies | |
| 5,984,349 A | 11/1999 | Van Voorhies | |
| 5,986,221 A | 11/1999 | Stanley | |
| 6,021,863 A | 2/2000 | Stanley | |
| 6,045,155 A | 4/2000 | Cech et al. | |
| 6,056,079 A | 5/2000 | Cech et al. | |
| 6,069,325 A | 5/2000 | Aoki | |
| 6,076,853 A | 6/2000 | Stanley | |
| 6,109,117 A | 8/2000 | Stanley et al. | |
| 6,129,440 A * | 10/2000 | Reynolds | G02B 6/0006 |
| | | | 362/559 |
| 6,323,444 B1 | 11/2001 | Aoki | |
| 2007/0055428 A1* | 3/2007 | Kong | B60R 21/01538 |
| | | | 701/45 |
| 2009/0027188 A1* | 1/2009 | Saban | B60N 2/002 |
| | | | 340/439 |
| 2009/0039658 A1* | 2/2009 | Spurr | E05B 81/00 |
| | | | 292/336.3 |
| 2014/0059066 A1* | 2/2014 | Koloskov | G06F 16/40 |
| | | | 361/679.01 |
| 2015/0130605 A1* | 5/2015 | Helm | B60N 2/2806 |
| | | | 340/457.1 |
| 2016/0236678 A1* | 8/2016 | Upadhyay | B60R 21/01512 |
| 2017/0236395 A1* | 8/2017 | Cech | B60N 2/002 |
| | | | 340/449 |
| 2018/0022233 A1 | 1/2018 | Maguire et al. | |
| 2018/0186321 A1 | 7/2018 | Naghizadeh et al. | |
| 2020/0320318 A1 | 10/2020 | Ramaglia et al. | |

* cited by examiner

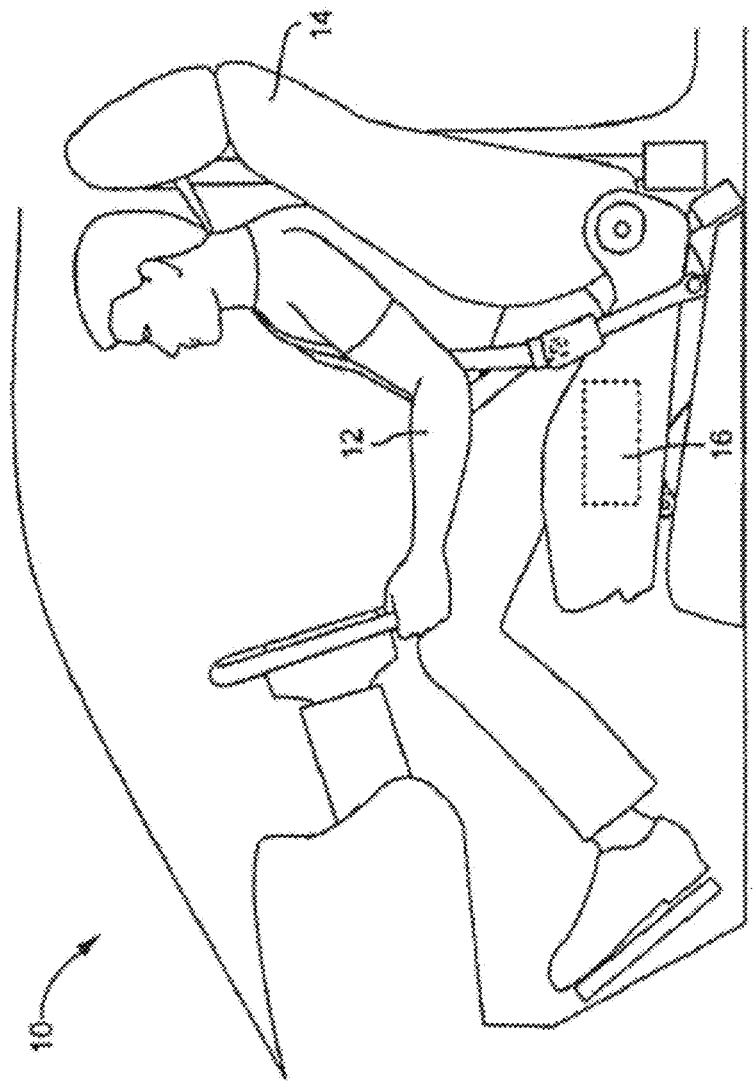

SYSTEMS AND METHODS FOR CHILD PRESENCE DETECTION WITH ACTIVE CHILD PROTECTION INTERLOCKS AND SAFETY WARNINGS

CROSS REFERENCE TO RELATED APPLICATIONS

This application claims priority to U.S. Provisional Patent Application Ser. No. 63/133,107 filed on Dec. 31, 2020, which is incorporated by reference as if set forth in its entirety herein.

BACKGROUND

The present disclosure relates generally to the field of sensing methods to detect a child in a vehicle to warn a driver or other adult that the child is still present before the driver or adult exits the vehicle. More specifically, the disclosure relates to capacitive sensing systems, weight sensing systems, and occupant monitoring camera systems to prevent a child from being left unattended in a vehicle. The term "vehicle" as used herein includes all of the broadest plain meanings for the term within the context of transportation (i.e., any references to an automobile are for example purposes only and do not limit this disclosure to any one embodiment).

Every year brings more incidents of children being accidentally left unattended in a vehicle with the adult in the car leaving the vehicle without realizing that the child has been left behind. Without the ability to exit on their own, the children face the dangers of extreme temperatures and even accidental death. There is a need for a system and method for accurately detecting that a child is present in the vehicle and that the adult is attempting to exit the vehicle while the child is still inside. A warning can be provided to the adult/driver as needed to remind the adult to check on all children who might be left in the car.

Numerous systems have been developed for differentiation of an adult driver, an adult passenger, a child occupant, and an object placed on a seat in an occupant classification system. For example, U.S. patent application Ser. No. 15/655,542, published as Pub. No. 2018/0022233 and incorporated by reference herein explains examples of occupant detection and classification systems. In certain earlier occupant classification systems, an occupant detection system may include a seat weight sensor and/or an electric field sensor, each operatively connected to a controller for detecting an occupant in a vehicle. The seat weight sensor is adapted to generate a measure of weight upon the vehicle seat, e.g. upon the associated seat bottom. The electric field sensor may include at least one electrode located, for example, in the seat bottom under the seat cover and close to the top of a foam cushion, and adapted to enable detection of a type of occupant or object that may be upon the seat bottom of the vehicle seat.

The seat weight sensor is responsive to a force upon the vehicle seat. The seat weight sensor, for example, may include one or more load cells operatively coupled to at least one load path between the seat bottom and the vehicle, e.g., between the seat frame and the floor pan of the vehicle, e.g. at the corners of the seat frame, so as to measure the weight of the entire vehicle seat and objects or occupants placed thereon. For example, the one or more load cells could use a strain gauge, a magnetic-restrictive sensing element, a force sensitive resistive element, or another type of sensing element to measure the associated load. For example, the seat weight sensor may be constructed in accordance with the teachings of U.S. Pat. No. 5,905,210, 6,069,325 or 6,323,444, each of which is incorporated herein by reference.

The seat weight sensor may alternately include at least one mass sensing element, e.g. a force sensitive resistive element, a membrane switch element, a pressure sensitive resistive contact, a pressure pattern sensor, a strain gage, a bend sensor, or a hydrostatic weight sensing element, operatively coupled to one or more seating surfaces in the seat base or seat back, e.g. in accordance with the teachings of U.S. Pat. No. 5,918,696, 5,927,427, 5,957,491, 5,979,585, 5,984,349, 5,986,221, 6,021,863, 6,045,155, 6,076,853, 6,109,117 or 6,056,079, each of which is incorporated herein by reference. For example, the seat sensor may have a hydrostatic sensing element—e.g. a fluid containing bladder, underneath the seat cover of the seat bottom and supported by the seat frame—wherein a pressure sensor operatively connected to the bladder measures the pressure of the fluid contained therein so as to provide a measure of occupant weight. The pressure sensor is operatively connected to the controller so as to provide a pressure signal thereto, which determines a measure of weight therefrom.

Other occupant detection systems include an "electric field sensor," referring to a sensor that generates a signal that is responsive to the influence that an individual or object being sensed has upon an electric field. One form of electric field sensor is a capacitive sensor, wherein the capacitance of one or more electrodes is measured—from the relationship between received and applied signals—for a given electrode configuration. What has commonly been referred to as capacitive sensing actually comprises the distinct mechanisms of what is referred to to as "loading mode," "shunt mode", and "transmit mode" which correspond to various possible electric current and/or electric field pathways. In the "shunt mode", a voltage oscillating at low frequency is applied to a transmit electrode, and the displacement current induced at a receive electrode is measured by sensing electronics, whereby the displacement current may be modified by the body being sensed. In the "loading mode", the object to be sensed modifies the capacitance of a transmit electrode relative to ground. In the "transmit mode", the transmit electrode is put into circuit transmission with the user's body, which then becomes a transmitter relative to a receiver, either by direct electrical connection or via capacitive coupling.

Accordingly, the electric field sensor is either what is commonly known as a capacitive sensor, or more generally an electric field sensor operating in any of the above described modes. The electric field sensor may include at least one electrode operatively coupled to at least one applied signal so as to generate an electric field proximate to the at least one electrode, responsive to the applied signal. The applied signal, for example, includes either an oscillating or pulsed signal. At least one electrode is operatively coupled to a sensing circuit that outputs at least one response signal responsive to the electric field at the corresponding electrode wherein the response signal is responsive to at least one electric-field-influencing property—for example, dielectric constant, conductivity, size, mass or distance—of an object proximate to the electric field sensor. For example, for the electric field sensor as a capacitance sensor, the sensing circuit measures the capacitance of at least one electrode with respect to either another electrode or with respect to a surrounding ground, for example, a seat frame of the vehicle seat, connected to circuit ground. The at least one applied signal is, for example, generated by the sensing circuit that also outputs the at least one response signal. The sensing circuit and associated at least one applied signal may be adapted to be responsive to the influence of a water soaked vehicle seat, on measurements from the electric field sensor.

The sensors described above may detect, and record with a computer, an empty vehicle seat, an infant seat, a child seat, or a booster seat on the vehicle seat with or without an infant or child seated therein. The sensors also distinguish adult passengers in seats, conductive objects on seats, or an occupant on the vehicle seat in a position that is substantially different from a normal seating position. The at least one electrode may be, for example, located under the seat cover and substantially the same size as a region to be sensed on the vehicle seat, extending from near the back of the seat bottom to near the front of the seat bottom.

In some non-limiting embodiments, the electric field sensor has a relatively short range and principally senses an occupant when a large surface of the occupant is relatively close to the sensor. Occupants normally seated directly on the seat cover typically have a large surface of their body relatively close to the electrode. When infants or children are in child seats, most of their body is elevated several inches off the seat bottom surface, resulting in a relatively small influence upon the electric field sensor. The electric field sensor in the seat bottom distinguishes between a large body immediately above the seat cover—for example a normally seated, forward facing teen or adult occupant in the seat—and an infant or child seat—including rear facing, front facing and booster seats—that are located on a vehicle seat. When the vehicle seat contains a child seat (including a rear facing infant seats, a forward facing child seat and a booster seats), or when the vehicle seat is empty, no forward facing occupant is detected near to the seat bottom and, as a result, the electric field sensor can communicate the occupant status to a computer.

An electrode of the electric field sensor may be constructed in a variety of ways, and the method of construction is not considered limiting. For example, an electrode may be constructed using rigid circuit board or a flexible circuit using known printed circuit board techniques such as etching or deposition of conductive materials applied to a dielectric substrate. Alternately, an electrode may comprise a discrete conductor, such as a conductive film, sheet or mesh that is distinct from or an integral part of the vehicle seat or components thereof. The assembly of one or more electrodes together with the associated substrate is sometimes referred to as a sensing pad or a capacitive sensing pad.

The above described technology has also been incorporated in occupant classification systems using a heater as a sensor. The seat may include a heater controller to regulate the heaters in the seat bottom and/or the seat back and an electronic control unit (ECU) coupled to the sensors in the seat bottom and/or seat back to detect and categorize an object or occupant in the seat. The ECU may include sensing and measurement circuits. If the sensor is integrated into the heater system, the heater controller and the ECU may be connected in series such that power and/or control signals may be provided to the conductor (i.e., sensing and heater device) by, for example, the heater controller through the ECU. While the heater controller and the ECU are often provided under the seat bottom of a vehicle, in various embodiments the heater controller may be provided elsewhere in the vehicle.

Up until recent developments, the Occupant Classification Systems of the prior art have depended upon either the above noted capacitive sensing methods or a seat weight rail system. A seat weight rail system measures deflection of the seat rails and determines a weight on the seat. This gives 5 states of measurement: 1 yo, 3 yo, 6 yo, 5th female, 50th male. This system is expensive and heavy (a concern for electric vehicles).

Embodiments of an Occupant Classification System using seat weight rail systems, capacitive sensing, and heater as a sensor embodiments have been heavily scrutinized by regulatory bodies in the United States and abroad. For example, in the United States, Federal Motor Vehicle Safety Standards No. 208 (FMVSS 208) has recognized deficiencies in the use of capacitive sensing and heater as a sensor embodiments for occupant classification. In particular, these prior embodiments do not adequately provide clear occupant classification distinctions between vehicle occupants that, with the technology described above, must be grouped together. For example, in the case of capacitive sensing, the system is not accurate enough to provide classification beyond "large" (e.g., 5th percentile sized female and larger) and "small" (infant or empty vehicle seat). A system of occupant classification, using capacitive sensing, for example, may distinguish a general division in classes with infant—female separation in weight classes providing the only classification threshold. This threshold, however, does not provide the best resolution to distinguish the characteristics of occupants within the large and small categories.

Infant-Female separation is a weight based measurement system using capacitance as described above but only provides a two state solution. Several publicly available charts promulgated by the National Highway Traffic Safety Administration show how the United States regulation FMVSS 208 has mapped certain un-identifiable and non-classifiable grey zones in traditional occupant classification systems, namely a system using a heater as a sensor technology for capacitive sensing. The grey zones in these public documents reflect that currently used occupant systems are largely ineffective to determine physical characteristics, and associated safety protocols, when occupants are between the traditional small and large classifications (e.g., small adults sized larger than a six year old child and smaller than a $5^{th}$ percentile female, as well as adults sized between $5^{th}$ percentile females and $50^{th}$ percentile males). The following table shows certain categories used today to illustrate occupant classification: in the chart of FIG. 1A:

| | |
|---|---|
| 1 YO | 1 Year Old Infant |
| 3 YO | 3 Year Old Child |
| 6 YO | 6 Year Old Child |
| $5^{th}$ Fe | $5^{th}$ Percentile Female by Weight - Live |
| $50^{th}$ Male | $50^{th}$ Percentile Male by Weight - Live |

Again, these categories show unreliable grey zones between a six year old child and a small adult who can weigh significantly less than 100 pounds. The same kind of grey zone is present between females weighing over 120 pounds and men weighing, for example, under 135 pounds. Accuracy in these categories is extremely important in regulations dictating how vehicle manufacturers design vehicle seats, air bag deployment statuses, and numerous safety features in a vehicle. Upon the above considerations, new guidelines from regulatory bodies such as the United States New Car Assessment Program via the National Highway and Transportation Safety Administration require improved occupant classification technologies to remedy the grey zones in traditional classification systems. In fact, certain prior art technology, such as older seat track position sensors, will no longer be allowed for occupant classification purposes.

Attempts to cure the problems with the above described grey zones have brought forth newer and more advanced Occupant Monitoring Systems. In one commonly owned disclosure set forth in U.S. Ser. No. 16/841,154, published as U.S. Pub. No. 2020/0320318, incorporated by reference herein, a vehicle cabin monitoring system includes an image sensor connected to a computer processor and computer memory storing software that controls the image sensor, wherein the image sensor is positioned to capture images of at least a portion of a vehicle interior. At least one reference structure may be positioned in the vehicle cabin within a field of view of the image sensor. In some non-limiting embodiments, an optically active component is positioned on the reference structure, such that the reference structure incorporates a lighted surface that is included within at least one of the images. A sequence of the images shows differences regarding the lighted surface of the reference structure, and differences in the images indicate at least one status change of at least one item in the vehicle interior. In other embodiments, the image sensor may be incorporated into a system that detects and tracks physical features of occupants in a vehicle, as explained in commonly owned the disclosure set forth in U.S. patent application Ser. No. 15/834,664, published as U.S. Pub. No. 2018/0186321, incorporated by reference herein.

For the purpose of this disclosure, one non-limiting example of an active optical image sensor is a 3-D Time of Flight camera that can emit sinusoidal light using LED(s) or laser diode(s) with a center wavelength of approximately 850 nm and a range of +/−50 nm. The camera includes an image sensor having a pass band filter using the same center wavelength of 850 nm (or any other chosen wavelength) and corresponding range so that the image sensor is sampled at two or more equally spaced times during the light source sine wave (DT1, DT2, . . . ). By using a very fast sine wave, compared to the fastest possible movement of objects, the detected "point cloud image" represents a three-dimensional snapshot of the image sensor field of view. The duration for which the camera integrates collected light at these sampling times (e.g. integration times) can also be controlled within the image sensor. The intensity of the light reaching the image sensor is a function of the emitted light wavelength range, intensity and phase, the location (distance) of objects within the field of view, the size and orientation of the objects, and other factors such as the surface characteristics of the objects (e.g. material reflectivity in the sensor detector wavelength range, macroscopic/microscope surface normal, e.g., rough or smooth).

For the purpose of this disclosure, an example application is defined as a Occupant Monitoring System (CMS). In this non-limiting example, a 3-D TOF sensor is fixed within a vehicle and collects sequential point cloud images which are used by computer algorithms to discretely or continuously monitor the full cabin to the extent that a camera field of view and range make the full cabin view possible. The CMS also encompasses human occupants and objects within the cabin.

BRIEF SUMMARY OF THE DISCLOSURE

A passenger protection system for a vehicle includes a vehicle sensor control system having at least one processor and computerized memory storing vehicle control software therein, wherein the vehicle control software receives input data from a plurality of vehicle sensors. A digital control sequence is triggered in the software by a presence of at least one occupant other than a driver in the vehicle who is classified as a child, with the digital control sequence activating and de-activating an alert system and a system of electronically programmed interlocks in a vehicle control system. The alert system includes at least one of an audible alert and/or a visible alert and/or a haptic alert to ensure child safety in the vehicle during operation. The interlocks may electronically control numerous vehicle functions including window operation, seat position adjustment, and seat belt position adjustment.

In another embodiment, a passenger protection system for a vehicle includes a vehicle control system 500 comprising at least one processor 501 and computerized memory 504 storing vehicle control software therein, wherein the vehicle control software receives input data 529A, 529B, 529C from a plurality of vehicle sensors 521A, 521B, 521C. An occupant monitoring system 599 connected to the vehicle control software also includes a plurality of sensors 595 that identify occupants in the vehicle. The occupant monitoring system includes classification software classifying the occupant according to a passenger classification system stored in the software. A digital control sequence 700 is triggered in the software by a classification of at least one occupant in the vehicle as a child 65B, the digital control sequence 700 activating and de-activating interlocks that configure components in the vehicle for child safety.

BRIEF DESCRIPTION OF THE DRAWINGS

These and other features, aspects, and advantages of the present invention will become apparent from the following description and the accompanying exemplary embodiments shown in the drawings, which are briefly described below.

FIG. 1 is a schematic environmental depiction of an interior of a vehicle in which the aspects of this disclosure may be implemented.

DETAILED DESCRIPTION

Figure 2A:
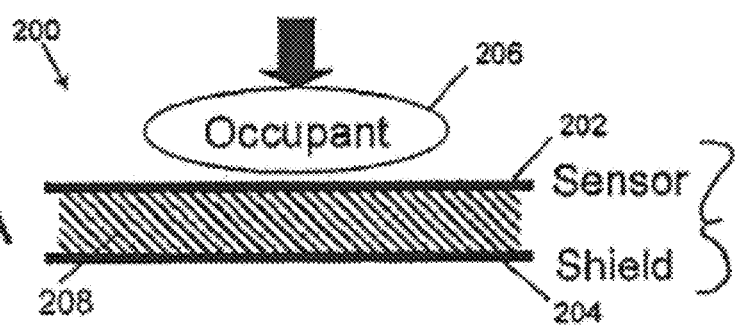
FIG. 2A is a cross section view of a capacitive occupant sensor for occupant detection as set forth herein with an occupant approaching the sensor.

The figures illustrate the exemplary embodiments in detail. However, it should be understood that the application is not limited to the details or methodology set forth in the description or illustrated in the figures. It should also be understood that the terminology is for the purpose of description only and should not be regarded as limiting.

A capacitive or electric field type sensor for use in an occupant classification system or occupant sensing system (for example, a system to detect occupancy of a vehicle seat) may be implemented in many ways. For example, according to one embodiment, an AC current may be provided to a sensing electrode located in a vehicle seat or other component, such as a steering wheel. The current or change in the current to the sensor may be measured and used as an indicator of the impedance from the sensing electrode to ground. In certain vehicle seat configurations, a seat heater may be provided.

In an occupant classification system, the occupant is classified using information from sensors that sense characteristics about the object located on a vehicle seat. Some systems sense the total weight on the seat. When a capacitive sensor is used to classify the occupant, the environment above the seat cover is sensed using various techniques to identify the dielectric and conductive properties of the occupant. A conductive sensing element is placed in the seat and, according to one embodiment, the impedance from the electrode to ground may be used as an indicator of the occupant situation above the seat cover.

The occupant detection and classification system is configured so that the environment below the seating surface does not influence the classification of the occupant. When a seat heater is provided, typically a resistive heater is employed. A resistive heater is essentially a grounded wire or conductor located in the vehicle seat. The sensing electrode for an occupant classification and detection system may be placed above the seat heater. If the orientation between the sensing electrode and the heater changes, the offset capacitance will change and the change may result in a negative impact on the ability of the system to accurately classify the occupant. For example, the detection system may be configured to include an offset for the measurement of an empty seat conduction. If the empty seat offset of the measurement drifts significantly (e.g., due to a change in orientation of the electrode and heater), the system may not accurately classify the occupant.

According to various exemplary embodiments, a sensing system for automotive occupant classification may use various conductors in the seat as sensing electrodes. For example, the sensing system may include a "sensor" conductor or assembly located proximate a "shield" conductor. These two conductors, often embodied in non-limiting examples as planar electrodes, are collectively referred to in this application as an "occupant classification sensor." In the embodiments described herein, therefore, an "occupant classification sensor" has two components, namely the sensor portion and an accompanying shield. The "sensor" and "shield" designations for either electrode may be reversed in any given embodiment.

According to other exemplary embodiments, a sensing system may use multiple electrodes on opposite sides of a thick piece of foam or any other elastomeric spacer. The electrodes themselves may be, without limitation, copper plates of appropriate thickness, e.g., copper tape. Measurements may be made while the electrodes are in various configurations. According to still other exemplary embodiments, a sensing system may combine or integrate weight sensing concepts with capacitive sensing concepts into a single system. The integrated system may use weight pressure information along with capacitive information to identify the occupant situation and produce a preferred classification.

Each of the electrodes in the seat back and seat bottom may be incorporated into a sensor pad or any other support structure. The sensor pad may include a layered structure. The sensor pad and sensing electrode may be constructed in a variety of ways, and the method of construction is not considered limiting. For example, the sensor pad may be constructed using a rigid or a flexible circuit board using known printed circuit board techniques such as etching or deposition of conductive materials applied to a dielectric substrate. Alternately, the sensor pad may be the foam cushion or seat pad itself with a discrete conductor, such as a conductive film, sheet or mesh, as the sensing element As described above, the sensing electrode may function as the seat heating element so as to provide a comfortable seating environment for the occupant. If heating is included, a temperature sensor may be disposed near an output of the heating element, which may be used for controlling the temperature of the seat. The controller may include a temperature controller that incorporates a temperature measuring circuit which can receive measurements from the temperature sensor to determine the temperature of the sensor pad and a temperature generating circuit which may provide a signal to the heating element in order to control its operation so that a desired temperature of the seat can be maintained in a closed-loop process. The sensor pad may further include a shielding electrode for shielding the sensing electrode from interference from surrounding conductive components.

According to various exemplary embodiments, a sensing system may use electronic methods for making capacitive measurements (e.g., using high frequency current measurements or other methods). The sensor assembly materials may include any type of conductive material for the electrodes (e.g., copper, conductive inks, conductive fabrics, etc.) and any compressible material for the spacer between the sensor and the shield (e.g., non-woven felts, woven materials, foams, polymers, dielectrics, materials used to allow air flow for forced air climate control seats, or any other material that will significantly compress at pressures under 1 psi).

Referring to FIG. 1, a vehicle 10 is shown with an occupant 12 in a seat 14 of the vehicle 10, according to an exemplary embodiment. The seat 14 may include an occupant classification and detection system 16. As shown in FIG. 1, the occupant classification system 16 may generally be located in the seat 14 below the area in which an occupant 12 of the vehicle 10 sits, or may be located in other areas of the seat 14 or vehicle 10. FIG. 1 shows the sensor associated with a driver seat, but the sensor may be operable in any vehicle seat.

The occupant classification system 16 may generally include a sensor, a shield, and electronics for sensing and classifying the occupancy of the seat 14. For example, the sensor may be used to provide measurements that correspond to the effect of an object on the sensor due to both the conductivity and weight of the object. Measurements from the sensor may be evaluated to determine the existence of an object or occupant in the seat 14. The occupant classification system 16 may include or be configured to operate in conjunction with a seat heating system and/or other systems for the seat 14 of the vehicle 10.

The occupant classification system 16 includes a capacitive or electric field sensor that includes a sensing electrode as described below in regard to FIG. 2. The capacitive sensor may generally be capable of sensing properties such as a proximity, position, or weight of an object, or the like. Various measurements from the sensing electrode may be used to detect the presence of an object in the seat. For example, the system may measure the change in capacitance (e.g., changes in an electrical property between two conductive objects). As an occupant 12 sits on seat 14, the system may detect a capacitance change to determine the presence of the occupant 12 by the occupant classification system 16.

Other exemplary embodiment of a capacitive or electric field type occupant classification and detection system may be configured in various embodiments. One illustrative system includes an upper electrode and a lower electrode for sensing an occupant. The system further includes electronics (e.g., sensing and signal conditioning electronics) configured to provide current or signals to drive the electrodes and to provide measurements on the electrodes. The occupant classification and detection systems disclosed herein may include a controller, processor or electronic control unit (ECU) that controls the system and receives various measurements from the system components (e.g., the sensing electrodes). The controller is configured to interact with other vehicle systems such as, for example, vehicle safety systems (e.g., airbag and scat belt systems). The controller may provide a signal to a vehicle safety system that indicates whether an adult person is located in the vehicle seat so that safety devices may be activated if appropriate. The controller for the occupant classification system may be integrated with a controller for another vehicle system such as, for example, the controller used for a vehicle safety system.

Figure 2B:
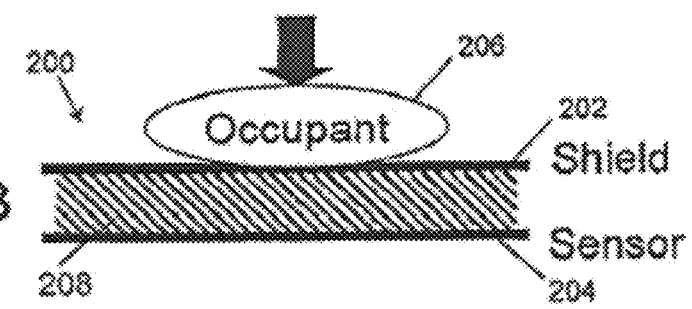
FIG. 2B is a cross section view of a capacitive occupant sensor for occupant detection as set forth herein with the occupant in contact with the sensor.
Figure 2C:
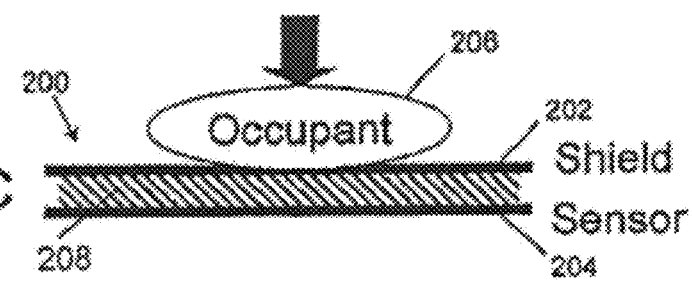
FIG. 2C is a cross section view of a capacitive occupant sensor for occupant detection as set forth herein with the occupant changing the position of at least one portion of the sensor and causing a change in corresponding impedance for detection by a computer.

Referring more particularly to FIG. 2, an occupant classification system is described that uses a sensor (e.g., a capacitive vehicle sensor 200) to detect seat occupancy and to detect a weight on the seat. The occupant classification system may generally include a sensor 202 and a shield 204 with a dielectric layer 208 there between. For one embodiment accomplishing occupant sensing, the sensor may be oriented above the shield to reduce the influence that objects located under the shield (e.g., a seat heater) have on sensor measurements. The classification system may include a weight or force sensing capability. When sensing the weight, the sensor and shield may switch orientations (e.g., via electronic switching) with the sensor oriented below the shield to reduce the influence objects placed on top of the seat (e.g., electronic devices) have on sensor measurements. The occupant sensing and weight or force sensing measurements may be used together to determine whether an object on the seat is a person and may reduce the false detection of objects as people. As shown in FIGS. 2A-2C, weight placed upon and/or removed from the sensor change the distance between the sensor plates 202, 204 and the measured capacitance of the dielectric layer 208.

Figure 3:
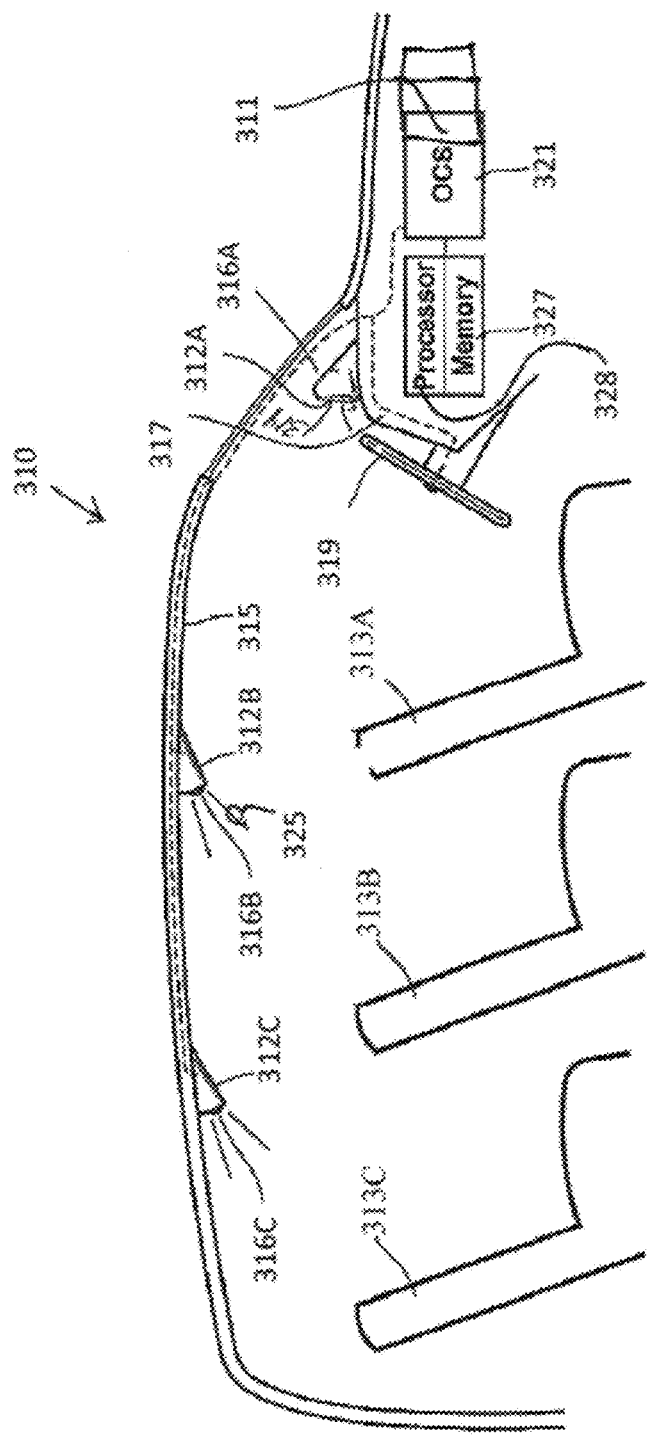
FIG. 3 is a schematic environmental depiction of an occupant monitoring system using imaging devices to detect physical aspects of occupants in a vehicle as set forth herein.

FIG. 3 is another overview schematic of a vehicle according to this disclosure including another non-limiting example of an Occupant Monitoring System that can be used with an Occupant Classification tool as discussed herein. In FIG. 3, rows of seats (313A, 313B, 313C) within the vehicle interior (310), or vehicle cabin, of a vehicle. The vehicle of FIG. 3 incorporates a driver' seat (313A) adjacent a steering wheel (319) and a common driver's control panel (317) (possibly including a viewing screen). The vehicle control system is not shown separately but would be implemented within a computer bank that includes processors (328), memory (327), electronic circuits, and at least one sensor necessary to establish a safe driving environment in the vehicle interior (310). The computers (311) in the vehicle may communicate with occupant classification systems (321) used to determine the entry/exit location, anatomy, age, adult/child/infant status, and other quantitative/qualitative characteristics of each occupant in the vehicle. The vehicle of FIG. 3 would typically include standard equipment from original equipment manufacturers (OEMs) such as seat belt assemblies shown in more detail in other figures. The vehicle of FIG. 3, however, illustrates installation of cameras (312A, 312B, 312C) having respective light sources (316A, 316B, 316C) and positioned in the vehicle interior (310) to establish respective fields of view (325) of occupants, seats (313), seat belt assemblies, and other structures in the vehicle. In this non-limiting example, the cameras/image sensors (312) (also known as optical sensors (312)) have been installed on the ceiling (315) of the vehicle and atop the driver's control panel (317). The vehicle includes the associated circuitry to connect the cameras (312), working in conjunction with light sources (16) and associated arrays/sensors (hereinafter "image sensors" (314)), to a vehicle control system operating via a computer bank of computers (311).

The occupant classification system ("OCS") (321 in FIG. 3) may include numerous kinds of hardware, position sensors, pressure sensors, weight sensors, and the like to identify a vehicle occupant so that a vehicle meets regulatory requirements. Many traits of an occupant are currently identified by an OCS to assist in controlling air bag deployment as well as other restraint systems, alerts, and operational control signals. In non-limiting embodiments of this disclosure, images gathered pursuant to the methods and systems herein may be used in conjunction with an occupant classification system (OCS) to identify proper seat belt placement for many different levels of human development (e.g., adult, child, infant) as well as anatomy structures (large male, average male or female, small female). Optimal seat belt placement for these diverse occupants will be significantly different for each. An OCS may receive data from the computerized imaging systems described herein to conduct edge analyses to detect occupant forms, 3-D depth analyses for torso position, and anatomical dimensioning for seat belt confirmation relative to the occupant's body. Single camera and multi-camera systems for both seat belt monitoring and occupant classification are well within the scope of this disclosure.

One goal of the embodiments disclosed herein is to establish combinations of data values that are conveniently combinable to improve the safety performance of vehicle systems and to provide a basis for the warning systems discussed below. In particular, the occupant classification system of this disclosure uses data from multiple occupant classification sensors ("OC sensors"), shown by way of non-limiting examples as OC sensors 521A, 521B, 521C in FIG. 5. Without limiting the disclosure, an OC sensor may be an electronic sensor, a weight sensor, a capacitive sensor, or an image sensor/camera as discussed above. Each of these OC sensors is configured to provide an output signal to a controller, or other microprocessor 501, via a respective sensing circuit 502 to assess a physical characteristic of an occupant in a vehicle seat or the lack of an occupant in the vehicle seat. The OC sensors may be strategically placed in the vehicle interior, steering wheel, vehicle seats, and other vehicle component constructions within previously identified zones to provide more than one output signal for comparison purposes, for statistical analysis, and to control other systems in the vehicle pursuant to safety regulations.

Figure 4:
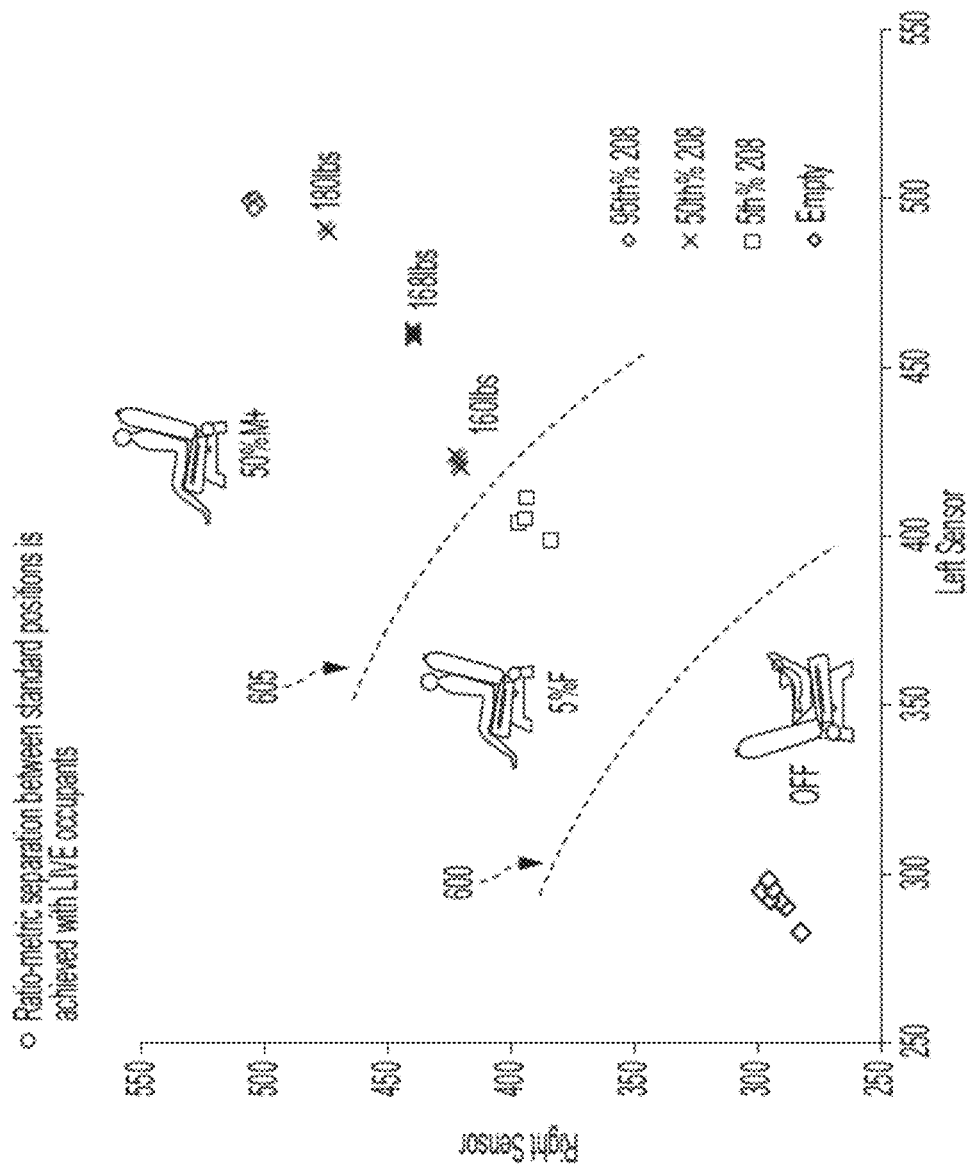
FIG. 4 is a schematic plot of input data received by a computer from classification sensors used to classify a vehicle occupant as set forth herein.

Overall, as noted above, placing multiple OC sensors in the vehicle provides opportunities to utilize the data provided by each OC sensor to define improved threshold boundaries for each classification necessary to identify the physical characteristics of an occupant in the seat. The occupant classification system set forth in this disclosure is particularly adapted to utilize threshold boundaries that have been absent from systems of the prior art. Notably, OC sensors may be utilized to establish threshold boundaries separating an empty or infant occupant of a vehicle seat from a 6 year old child in the seat, separating a 6 year old child classification from a $5^{th}$ percentile weight adult female classification, and separating a $5^{th}$ percentile weight adult female classification from a $50^{th}$ percentile weight adult male classification. FIG. 4 illustrates one graphical embodiment of multiple sensors, at least sensor 1 and sensor 2, providing data that places the occupant into an occupant classification system.

In general, and without limiting the scope of the embodiments of this disclosure, the current standards for occupant classifications include a 5th percentile adult female classification, which includes occupants having a weight of between 85 to 120 pounds; occupant classifications for a $50^{th}$ percentile male classification includes occupants having a weight of between 130 and 190 pounds. The system shown herein may also distinguish between a first child classification, which includes occupants having a weight of less than 20 pounds, a second child classification, which includes occupants having a weight of between 20 and 40 pounds, and a third child classification, which includes occupants having a weight of between 40 and 60 pounds.

Figure 5:
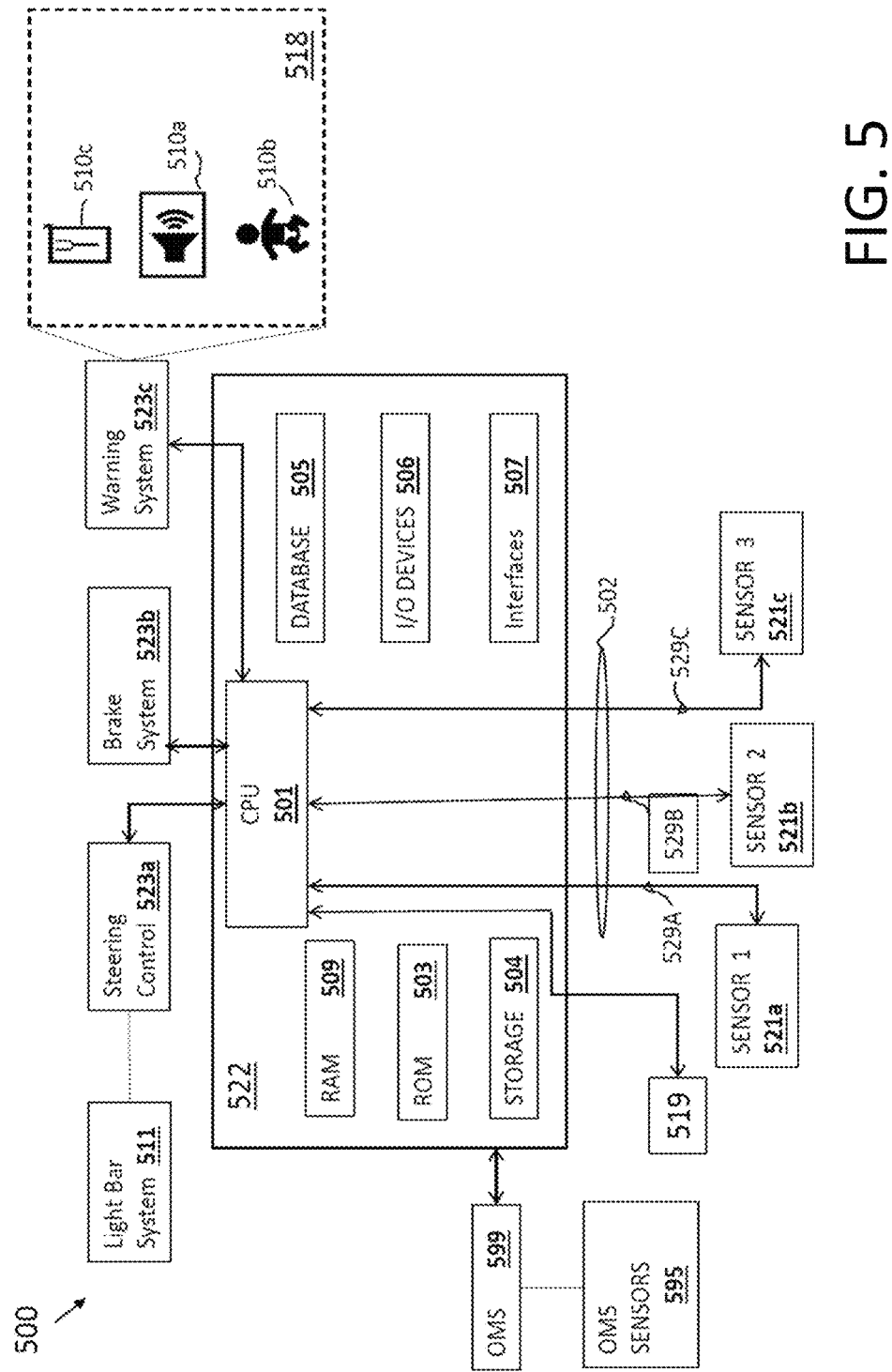
FIG. 5 is an overview schematic illustration of a vehicle sensor control system with an associated alert system as set forth herein.

With one goal of the embodiments of this disclosure being to utilize higher resolution thresholds between occupant classifications, an occupant classification system may be configured to use pairs of occupant classification sensors 521A, 521B, 521C of FIG. 5 (again, the "OC sensors") in numerous combinations to identify a vehicle occupant by a proper weight classification. Identifying the occupant with output from more than one OC sensor helps to minimize confusion between small adults and children and confusion between small adults and slightly larger adults whose weight lies between a $5^{th}$ percentile female and $50^{th}$ percentile male. The system is also better prepared to minimize any confusion between an occupant and conductive items on a vehicle seat (i.e., cell phones, computers, GPS accessories, and the like) that may change the electrical current response, such as capacitive or induction readings on a sensor in the vehicle seat.

Before using the occupant classification system in a vehicle, the threshold boundaries for the preferred occupant classifications are established with live test subjects and a plurality of output signals from numerous OC sensors. In the example shown in FIG. 4, and without limiting the embodiments to any one theory of operation, the test data for live subjects is plotted with an output signal value (or representative inductance value calculated for a respective OC sensor from the output signal) along respectively assigned x and y axes for each respective OC sensor output. The test data is calibrated so that each test occupant's known weight is associated with the coordinate system used to plot the test data (i.e., inductance values for each respective OC sensor along the x and y axes). By statistically analyzing the test data and the associated relations to threshold boundaries established by threshold data, the system described herein can use the threshold boundaries to calculate an occupant as fitting within a particular classification (infant or carrier seat, 6 year old child occupant versus $5^{th}$ percentile weight adult female occupant (boundary 400), and larger female versus $50^{th}$ percentile weight adult male (boundary 405)) may be established. In one non-limiting example, the threshold boundaries for each classification may be determined by midpoint or statistical mean analysis to plot the classification threshold boundaries in a classification system between the statistically significant test data points for various weights. The threshold boundaries may include tolerance levels, specified for any given application, to move the threshold boundary in one direction or another, thereby adjusting the occupant classification scope and resolution. Accordingly, the threshold boundaries are customizable for particular applications.

Upon customization of the threshold boundaries from live test data, as shown in FIGS. 4 and 5, the OC sensors 521A, 521B, 521C each provide output signals to the controller/microprocessor/CPU 501 that quantifies an electrical signal response present at that OC sensor in a respective zone of the vehicle seat. In the example of FIG. 5, each quantified electrical response can be plotted as a coordinate in a coordinate pair on the same coordinate system as the threshold boundaries as shown in FIG. 4. In this way, the system described herein is scalable in a way that other previously used occupant classification systems have not been.

Using pairs of OC sensors in selected zones of a vehicle seat structure allows for weighting of the zoned output signals emanating from each OC sensor in statistically significant ways determined empirically for particular applications. The output signals, bearing digitally recordable identification as emanating from one of the selected OC sensors in one of the selected zones, allows for not only higher resolution in occupant classification but also exponentially more combinations of data points to adjust other vehicle systems, particularly air bag deployment and seat belt signaling.

FIG. 4 illustrates just one coordinate system in which threshold boundary data 400, 405 may be compared against OC sensor data. This representation in FIG. 4 is merely an example for ease of explanation, and an occupant classification system may compare the data in computerized hardware without actually compiling an x and y axis plot. Statistical and data processing techniques may also be used to compile OC sensor data into multi-dimensional coordinate systems, multi-dimensional tables, computerized registers, and numerous other coordinate systems used to track and compare data points in a computerized system. Accordingly, it is well within the scope of the occupant classification system disclosed herein for computer hardware (processors, controllers, memory, graphics cards, and the like) to overlay data from many OC sensors and many pairs of OC sensors into one overall coordinate system to accomplish the objectives. The term "coordinate system," therefore, is not limited to graphical coordinates but may be represented in any computerized form subject to statistical and data processing techniques.

As discussed above, the OC sensors and associated computer system may be represented in a sensor control system 500 of FIG. 5 to identify which occupants in a vehicle are adults (i.e., not children under a certain age) and which occupants are infants, toddlers, and children that are too young to exit a vehicle alone and should not be left unattended in a vehicle. Once the occupant classification is completed with a variety of sensor types, the controller/microcontroller/CPU 501 of FIG. 5 may use the occupant classification data to provide control signals to other systems including but not limited to a steering wheel lighting system (i.e., a "lightbar" 511), steering control and assisted driving algorithms 523A, a braking system 523B, and a warning system 523C discussed further in the below disclosure. The various systems receiving data and control information within the sensor control system 500 is not limited to those shown in FIG. 5 because the schematic representation of the control system therein is non-limiting and may include any other vehicle system that can be controlled from a computer in data communication with the vehicle components. The overall vehicle computer environment 522 may include not only the CPU 501, but other computerized components including but not limited to random access memory 509, read only memory 503, computer memory and storage 504, database and information storage structures 505, other input/output devices 506 and associated connections, as well as numerous computer interfaces 507 that interact with vehicle hardware.

This disclosure takes advantage of the numerous kinds of Occupant Monitoring Systems, Occupant Classification Systems, and Occupant Classification Sensors as described in the above discussion and the associated figures. With so many tools to discern which occupants are adults and which occupants are children at various stages of development, methods and systems of this disclosure are fully functional to realize new warning systems and new automatic safety functions within the vehicle. In certain non-limiting embodiments, this disclosure is particularly directed to a system of vehicle component interlocks and associated warnings that can prevent children from being in dangerous positions in the vehicle. Without limiting this disclosure to any one definition, an interlock includes all software commands that result in electro-mechanical devices being operated for a desired function based on software instructions. In many instances, an interlock makes a state of two devices function in accordance with each other, depending on their respective states.

One example embodiment utilizes the various sensor data received from at least one sensing circuit 502 of occupant classification sensors 521A, 521B, 521C, the number of which is entirely optional. As shown in FIG. 5, computerized embodiments herein utilize computer programs having computer instructions that implement warning algorithms and pre-programmed electrical and mechanical interlocks based on information regarding the classification of each occupant and other control data received by the CPU 501, particularly other control data indicating that a child of a certain age needs to be further protected. This other control data may include indicators from numerous vehicle sensors indicating a vehicle speed, that the vehicle has stopped or parked, the ignition has been switched off, audio-visual accessories have been switched on or off, parking brake engagement, or image data showing occupant positions in the vehicle and/or seat belt positions in the vehicle. This other control data 519 may be transmitted to the CPU 501 from numerous interfaces 507 connected to vehicle control sensors that are part of an overall vehicle control and communication system. All of this information may be utilized to implement a warning alert system 518, particularly a warning system 523C to alert an adult or the driver that a child needs attention in the vehicle. As shown in FIG. 5, the warning system may include an audible warning signal 510A, a visible warning signal 510B, and haptic warning signal 510C.

In one example embodiment, a passenger protection system for a vehicle includes a vehicle sensor control system 500 having at least one processor 501 and computerized memory 504 storing vehicle control software therein, wherein the vehicle control software receives input data 529A, 529B, 529C from a plurality of vehicle sensors 521A, 521B, 521C, which may include occupant classification sensors, image sensors, or other control sensors within the vehicle. Using this sensor input data, the processor (i.e., CPU, microprocessor, or controller) 501 identifies a presence of at least one occupant 12, such as a passenger other than a driver in the vehicle, and that identification triggers a digital control sequence implemented by the CPU 501 and/or other vehicle control computers that are active during vehicle use. In one embodiment, the digital control sequence functions to issue at least one warning signal from a computerized warning system 523C in data communication with the CPU 501. The at least one warning signal is activated in a way that is likely to be noticed by an occupant 12, such as the driver or other passenger occupants in the vehicle, to alert the occupant 12 that at least one other passenger occupant, such as a child that needs care, is in the vehicle 10 and should be attended before continuing to operate the vehicle. In the embodiments herein, the digital control sequence activates and de-activates an alert system 518 and child safety interlock system 580 within the vehicle 10 that is useful to prevent forgetting an occupant in the vehicle when that occupant cannot take care of themselves and/or cannot exit the vehicle themselves. The warnings may take on any form, placement, frequency, volume, intensity, or other characteristics, but in one non-limiting embodiment, the alert system 518 and child safety interlock system 580 implement warning signals or alerts 510A, 510B, 510C on or near a vehicle console, steering wheel, or audio-visual system to alert an adult/driver of the status of a young occupant. In some embodiments, the warning signals 510A, 510B, 510C emanate from a vehicle component including but not limited to a vehicle console, vehicle info-tainment system, and/or a door 600 of the vehicle that would be used by a driver. The warning signals, however, may be activated from any position in the vehicle that is appropriate to alert any occupant that another dependent occupant requires attention as discussed herein. In the embodiments of this disclosure, the alert system 518 and child safety interlock system 580 include at least one of an audible alert 510A and/or a visible alert 510B and/or haptic alert 510C within the vehicle 10. The audible alert may be any sound that is perceptible by a vehicle occupant and easily interpreted as requiring attention, such as, but not limited to, an automated voice attendant, a beeping sound, a siren sound, or any other audible input to the vehicle occupants. The visible alert may include any number of lighting arrangements that are positioned and colored to catch attention of occupants before exiting the vehicle. A haptic alert may be any signal that can be perceived by touch, such as vibrations or even temperatures, to provide an indicator that an occupant is in an unnecessarily dangerous status or position in the vehicle. The digital control sequence, implemented by computerized instructions in software, may activate the alert system 518 and child safety interlock system 580 and associated warning signals or alerts 510 in any order, i.e., simultaneously, sequentially, and in any combination. In one non-limiting example, the order of alert may increment as time passes or upon the sensor control system 500 utilizing input data 529 to determine that events within the vehicle are progressing toward an occupant such as the driver increasing speed or utilizing functions in the vehicle that place younger occupants at higher risk for accidents. The input data may originate from numerous sensors and images described above. In one example, an alert sequence may include the visible alert 510B, followed by the haptic alert 510C, followed by the audible alert 510A.

Figure 6:
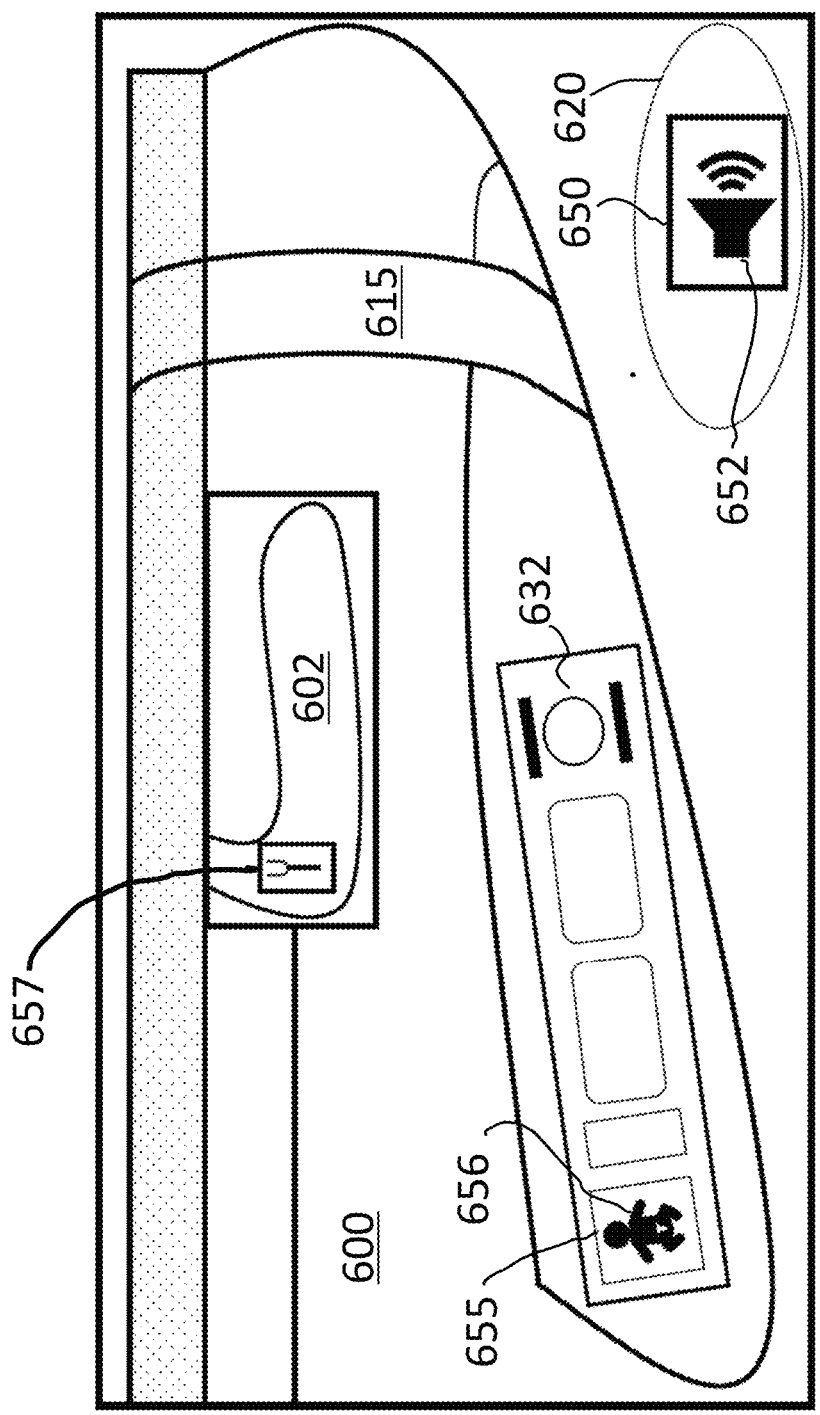
FIG. 6 is an example system of warning and alert buttons positioned on a door as one system of this disclosure.

Example embodiments are illustrated for example in FIG. 6 and may utilize audible alerts 650 emanating from a vehicle speaker 620 that is also connected to audio-visual accessories in the vehicle 10. The speaker 620 may include a computerized voice attendant that speaks commands and verbal warnings such as "occupant seat belts need attention" upon certain triggering input data 529. The input data in one example triggers the audible alert 650 if a warning is activated because the driver door 600 has been closed and the ignition started for driving. In some embodiments, the alert system 518 and child safety interlock system 580 provide a respective button 652, 656, 657 for a user to acknowledge each warning which may cause the corresponding alert, whether audible, visible or haptic, to stop or revert to a different status. The same or a similar button may include functionality to implement a bypass function triggered by a touch event by the driver, such as holding the respective button for a predetermined period of time, to temporarily halt warnings. The halt in warnings could be useful in situations when a driver and/or other adults in a vehicle are temporarily exiting a vehicle to do short term activities outside the vehicle like pump gas, retrieve items from the vehicle trunk, or quickly stop at a store or rest area.

The vehicle sensor control system 500 uses computerized components to implement the digital control sequence that activates the alert system 518 and child safety interlock system 580. The alert system 518 and child safety interlock system 580 use the digital control sequence to activate a monitoring and alerting vehicle occupants in a passenger protection system as described herein. To accomplish the alerts, an overall passenger protection system 500 illustrated generally at FIG. 5 is in electronic communication with an occupant monitoring system (the above noted OMS) and/or an occupant classification system (OCS) having at least one occupant classification (OC) sensor detecting the presence of the occupant other than the driver or other adults in the vehicle. The occupant monitoring system may include at least one imaging device 312 and light sources 316 identifying the driver and the at least one occupant other than the driver. The OC sensor may include any of a weight sensor, capacitive sensor 200, or any other tracking device by which the CPU of the sensor control system can be activated by the presence of adults and children in the vehicle.

Figure 7:
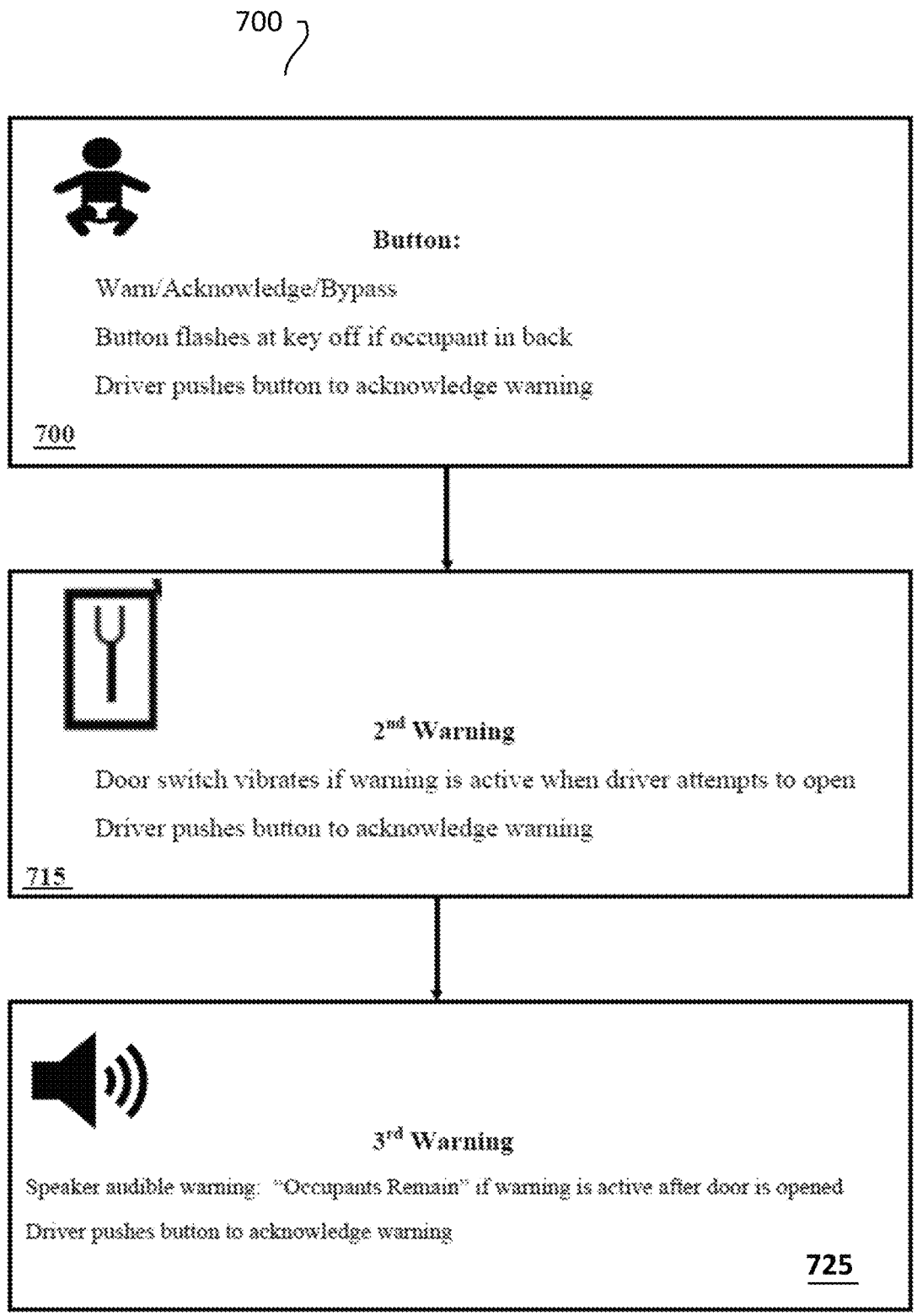
FIG. 7 is a flow chart of the computerized method of alerts and electronic interlocks of this disclosure.

As illustrated by the digital control sequence 700 of FIG. 7, in one non-limiting embodiment, the alert system 518 and child safety interlock system 580 include a visible warning function 705 that may be associated with a visible warning button 656, a haptic warning function 715 associated with a haptic switch button 657, and/or an audible warning function 725 emanating from a speaker 620 in the vehicle when the door is opened or another triggering event. The audible warning function 725 may be associated with an audible warning button 652 as shown in FIG. 6. The visible warning button 656, the audible warning button 652, and the haptic switch button 657 may be placed in any appropriate location to provide the best alerting function in a given vehicle. In the example of FIG. 6, the visible warning button may be positioned proximately to a bank of window switches 632; the audible warning button is positioned proximately to a vehicle speaker 620, optionally the speaker in a door 600, and the haptic switch button 657 is positioned in a place that a user is likely to touch in the vehicle, such as the door handle 602 of FIG. 6 or a steering wheel in other embodiments. All of these functions can also be completely turned off by a manual reset button that may be visible in a driver's console. The buttons of this disclosure may be mechanical or MEMS types of digital buttons.

In another embodiment, a passenger protection system for a vehicle includes a vehicle sensor control system 500 in data communication with at least one processor 501 and computerized memory/computerized storage 504 for storing vehicle control software therein, wherein the vehicle control software receives input data 529 from a plurality of vehicle sensors 521. An occupant monitoring system 599 is also connected to and in data communication with the plurality of sensors 521 configured to identify a presence of a driver and at least one other occupant in the vehicle, the occupant monitoring system 599 further having additional sensors 595 classifying the driver and the other occupant according to a passenger classification system stored in the software. A digital control sequence may be triggered in the software by a presence of the at least one occupant other than a driver in the vehicle, with the digital control sequence activating and de-activating an alert system 518 and child safety interlock system 580 and child safety interlock system within the vehicle. The alert system may include at least one of an audible alert 510A and/or a visible alert 510B and/or a haptic alert 510C. These alerts may be associated with corresponding hardware positioned on or in proximity to numerous components in the vehicle, such as a steering wheel or driver console, such that a driver or other adult is aware that a child needs attention in regard to vehicle safety features. Additional sensors, whether OC sensors or OMS sensors, classifying the driver and the other occupant, configure the software to utilize the digital control sequence 700 when a child is present in the vehicle, and that child is likely not able to care for themselves and needs attention for safety purposes. As noted above, the additional sensors may include image sensors and other occupant classification sensors that classify the driver and the other occupant according to weight or size. The additional sensors and associated input data classifying the driver and the other occupant may be at least one of an imaging device, a seat belt sensor, a size sensor, a weight sensor, a capacitive sensor, and the like.

In one embodiment, a passenger protection system 500 for a vehicle includes a vehicle control system 522 having at least one processor 501 and computerized memory 504 storing vehicle control software therein, wherein the vehicle control software receives input data 529A, 529B, 529C from a plurality of vehicle sensors 521A, 521B, 521C. A digital control sequence 700 is triggered in the vehicle control software by a presence of at least one occupant 65B classified as a child, with the digital control sequence activating and de-activating interlocks that control components in the vehicle for child safety.

Figure 8:
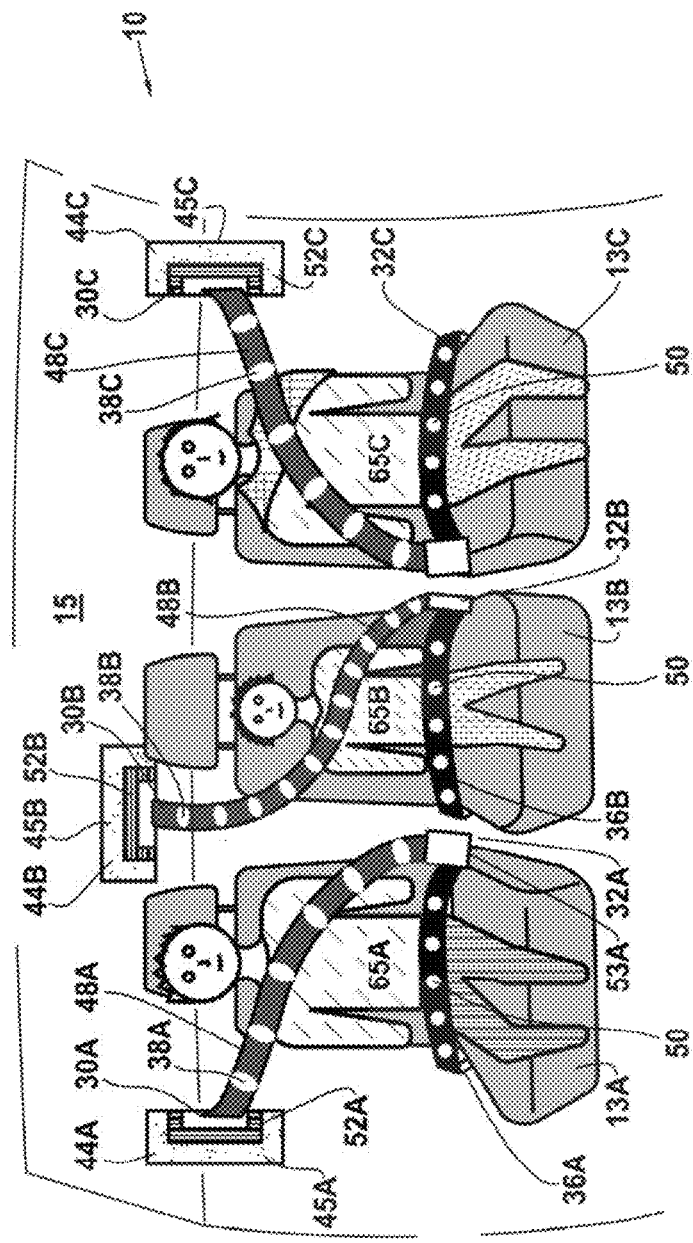
FIG. 8 is a front plan view of a back seat of a vehicle with seats and seat belts in use by occupants to be classified for alert and interlock signaling according to embodiments of this disclosure.

In a non-limiting example, the digital control sequence 700 activates interlocks that implement child safety door locks. In other embodiments, by using the classification system and associated occupant monitoring system, the interlocks activate at least one child safety door lock proximate a respective child without restricting other door locks proximate a respective adult. Other interlocks activate child safety window locks upon determining the size of a child in a particular seat. The interlocks may activate at least one window lock proximate a respective child without restricting other window locks proximate a respective adult. In yet another embodiment, the interlocks activate automatic seat belt adjustments for passengers, as illustrated in FIG. 8. The automatic seat belt adjustments may include a height adjustment to seat belt positioning on the child. One other advancement lies in the interlocks communicating with seat belt buckles, either wirelessly, electronically, or mechanically to control the ability of a properly buckled occupant to un-buckle the seat belt or child safety seat restraint. In some embodiments, adults may be allowed to manipulate a seat belt at will, but children under a certain age (e.g., six years old) cannot, particularly if the vehicle is moving.

The components within a vehicle interior that may be detected and tracked according to the embodiments of this disclosure are illustrated in FIG. 8 and may include occupants 65A, 65B, 65C with one of the occupants being a child 65B. Other components that may be used for classification and monitoring include, but are not limited to, a seat belt retractor assembly (i.e., a spool that unwinds and re-winds the seat belt into a webbing payout section (44A, 44B, 44C)), a payout aperture (30A, 30B, 30C) through which a seat belt extends, a portion of a seat belt assembly configured as a shoulder strap (48A, 48B, 48C), a lap strap (36A, 36B, 36C), a lap belt anchor (32A, 32B, 32C), web length adjustment hardware, a buckle, buckle hardware, a seat belt tongue, at least one face (53A, 53B, 53C) of the seat belt buckle, and peripheral hardware used to install or enable the seat belt assembly functions (e.g. d-rings 45A, 45B, 45C, retention buttons, and the like). The term "seat belt hardware" is not intended to be limiting of this disclosure and includes any structure of the seat belt assembly that provides any kind of connection, installation, or operation function relative to the lap strap and shoulder strap shown in FIG. 8. Any piece of the seat belt hardware may have patterns 38A, 38B, 38C or 52A, 5B, 52C that reflect or at least show up well for image detection purposes. Monitoring and tracking seat belt positions can be part of occupant classification techniques as well as part of triggering operations for alerts and warnings when the seat belt is not being used properly, especially for child safety.

In another embodiment, a passenger protection system for a vehicle includes a vehicle control system 500 comprising at least one processor 501 and computerized memory 504 storing vehicle control software therein, wherein the vehicle control software receives input data 529A, 529B, 529C from a plurality of vehicle sensors 521A, 521B, 521C. An occupant monitoring system 599 connected to the vehicle control software also includes a plurality of sensors 595 that identify occupants in the vehicle. The occupant monitoring system includes classification software classifying the occupant according to a passenger classification system stored in the software. A digital control sequence 700 is triggered in the software by a classification of at least one occupant in the vehicle as a child 65B, the digital control sequence 700 activating and de-activating interlocks that configure components in the vehicle for child safety.

The passenger protection system of the classification software classifies the occupants according to weight or size. In non-limiting embodiments, the classification software uses image data and/or occupant classification sensors described above to estimate a size of the occupant. Capacitive sensors described above (e.g., vehicle seat A-surface sensors for detecting changes in the electric field around a seat due to an occupant positioned thereon) or 3-D TOF sensors (also described above as collecting image data of the occupants) may be configured to use respective software to derive human features, e.g. torso surface area, shoulder height, head surface areas and relative positions of vehicle components, e.g., seat belt position on both adult occupants and child occupants.

The classification systems of this disclosure, therefore, may initiate the digital control sequence 700 of FIG. 7 for proper use of warning systems and child safety interlocks when a classification is selected from a one year old child, a three year old child, a six year old child, a 5th percentile female, and a 50th percentile male. In some embodiments, the classification software classifies the occupants according to a height measurement relative to a component in the vehicle. In some embodiments, such as that of FIG. 8, the classification software classifies the occupants according to a seat belt position on the occupant, a position of the occupant's face in the vehicle, a position of the occupant's head in the vehicle, and/or a position of a vehicle seat in which an occupant sits.

As noted above, the passenger protection system of this disclosure utilizes a plurality of vehicle sensors selected from at least one of an imaging device, a seat belt sensor, a capacitive e-field sensor, and a weight sensor. A classification of an occupant as a child initiates an alert system warning to warn at least a driver in the vehicle of a child safety alarm. The child safety alarm includes a warning that the child is at an insufficient height in a respective seat. Other non-limiting kinds of alarms include a warning that a speaker volume is too high or that a front seat passenger should be in the back seat.

A computer implemented method of protecting passengers in a vehicle is also disclosed herein and includes identifying a presence of a driver and occupants in the vehicle and further classifying at least one of the occupants as a child. The method is implemented by a computer to store, in computerized memory, input data received from sensors in the vehicle, the input data corresponding to at least the child in the vehicle. The software further initiates a digital control sequence with the computer to activate and de-activate interlocks that control components in the vehicle for child safety. The digital control sequence further initiates an alert system warning to warn at least a driver in the vehicle of a child safety alarm. The alert system may include warnings and alarms for numerous safety issues, including but not limited to an alarm that a height of the child is inappropriate relative to a seat in which the child sits. When appropriate hardware and mechanical aspects of a seat permit, the digital control sequence adjusts an automatic seat height adjustment. In other embodiments, the digital control sequence further adjusts a seat belt D-ring position to adjust a seat belt position on the child. The alarms can also be applied to objects positioned on a seat such as a child safety alarm advising a driver or adult passenger that a child safety seat position is inappropriate relative to an associated vehicle seat.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature The present disclosure has been described with reference to example embodiments, however persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability.

Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

In example implementations, at least some portions of the activities may be implemented in software provisioned on a networking device. In some embodiments, one or more of these features may be implemented in computer hardware, provided external to these elements, or consolidated in any appropriate manner to achieve the intended functionality. The various network elements may include software (or reciprocating software) that can coordinate image development across domains such as time, amplitude, depths, and various classification measures that detect movement across frames of image data and further detect particular objects in the field of view in order to achieve the operations as outlined herein. In still other embodiments, these elements may include any suitable algorithms, hardware, software, components, modules, interfaces, or objects that facilitate the operations thereof.

Furthermore, computer systems described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

The invention claimed is:

1. A passenger protection system for a vehicle, comprising:
   a vehicle control system comprising at least one processor and computerized memory storing vehicle control software therein, wherein the vehicle control software receives input data from a plurality of vehicle sensors;
   an occupant monitoring system connected to the vehicle control software and comprising a plurality of sensors that identify occupants in the vehicle, the occupant monitoring system comprising classification software classifying the occupant according to a passenger classification system stored in the software; and
   a digital control sequence triggered in the software by a classification of at least one occupant in the vehicle as a child, the digital control sequence activating and de-activating electro-mechanical interlocks that configure components in the vehicle for child safety, wherein the electro-mechanical interlocks activate and deactivate audible warnings, visible warnings, or haptic warnings in the vehicle;
   a respective digital button positioned in the vehicle, activated with activation of the electro-mechanical interlocks, and configured for a user to acknowledge the activating of the electro-mechanical interlocks, wherein the respective digital button is in communication with the vehicle control software;
   another digital button positioned in the vehicle in communication with the vehicle control software for the user to deactivate the electro-mechanical interlocks, and wherein the respective button or the another button allows the driver to deactivate the electro-mechanical interlocks with a bypass function.

2. The passenger protection system of claim 1, wherein the classification software classifies the occupants according to a seat belt position on the occupant, a position of the occupant's face in the vehicle, a position of the occupant's head in the vehicle, and/or a position of a vehicle seat in which an occupant sits.

3. The passenger protection system of claim 2, wherein the plurality of vehicle sensors comprise at least one of an imaging device, a seat belt sensor, and a weight sensor.

4. The passenger protection system of claim 1, wherein a classification of an occupant as a child initiates an alert system warning at least a driver in the vehicle of a child safety alarm.

5. The passenger protection system of claim 1, wherein the electro-mechanical interlocks activate and deactivate haptic alerts.

6. A passenger protection system for a vehicle, comprising:
- a vehicle control system comprising at least one processor and computerized memory storing vehicle control software therein, wherein the vehicle control software receives input data from a plurality of vehicle sensors;
- an occupant monitoring system connected to the vehicle control software and comprising a plurality of sensors that identify occupants in the vehicle, the occupant monitoring system comprising classification software classifying the occupant according to a passenger classification system stored in the software; and
- a digital control sequence triggered in the software by a classification of at least one occupant in the vehicle as a child, the digital control sequence activating and de-activating electro-mechanical interlocks that configure components in the vehicle for child safety;
- a respective digital button positioned in the vehicle, activated with activation of the electro-mechanical interlocks, and configured for a user to acknowledge the activating of the electro-mechanical interlocks, wherein the respective digital button is in communication with the vehicle control software;
- another digital button positioned in the vehicle in communication with the vehicle control software for the user to deactivate the electro-mechanical interlocks;
- wherein the electro-mechanical interlocks activate and deactivate audible warnings, visible warnings, or haptic warnings through the vehicle control software, and
- wherein the respective digital button or the another digital button further comprises a bypass function in conjunction with the vehicle control software that temporarily halts the audible warnings, visible warnings, or haptic warnings.

7. The passenger protection system of claim 6, wherein the bypass function is initiated by a touch event on the respective digital button or the another digital button.

8. The passenger protection system of claim 7, wherein the touch event is for a predetermined amount of time to initiate the bypass function.

9. The passenger protection system of claim 6, wherein the audible warnings, visible warnings, or haptic warnings are activated in a sequence.

10. The passenger protection system of claim 9, wherein the sequence is activated in an order from a visible warning, to a haptic warning, to an audible warning.

* * * * *